(12) United States Patent
Nigam et al.

(10) Patent No.: US 9,703,350 B2
(45) Date of Patent: Jul. 11, 2017

(54) ALWAYS-ON LOW-POWER KEYWORD SPOTTING

(71) Applicant: Maxim Integrated Products, Inc., San Jose, CA (US)

(72) Inventors: Vivek Nigam, Sunnyvale, CA (US); Yadong Wang, San Jose, CA (US); Anthony Stephen Doy, Los Gatos, CA (US); Todd D. Moore, Emerald Hills, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 679 days.

(21) Appl. No.: 13/925,705

(22) Filed: Jun. 24, 2013

(65) Prior Publication Data

US 2014/0281628 A1    Sep. 18, 2014

Related U.S. Application Data

(60) Provisional application No. 61/790,760, filed on Mar. 15, 2013.

(51) Int. Cl.
*G06F 1/32* (2006.01)
*G10L 15/08* (2006.01)

(52) U.S. Cl.
CPC ...... *G06F 1/3206* (2013.01); *G10L 2015/088* (2013.01)

(58) Field of Classification Search
CPC .................. G06F 1/3206; G10L 2015/088
See application file for complete search history.

(56) References Cited

U.S. PATENT DOCUMENTS

| | | | | |
|---|---|---|---|---|
| 6,023,676 | A | * | 2/2000 | Erell ............................. 704/241 |
| 2002/0193137 | A1 | * | 12/2002 | Bank ................... H04M 1/0214 455/550.1 |
| 2010/0019922 | A1 | * | 1/2010 | Van Loenen et al. ... 340/825.22 |
| 2013/0085757 | A1 | * | 4/2013 | Nakamura et al. ........... 704/254 |
| 2013/0110521 | A1 | * | 5/2013 | Hwang et al. ................ 704/500 |
| 2014/0012586 | A1 | * | 1/2014 | Rubin et al. .................. 704/273 |
| 2014/0122087 | A1 | * | 5/2014 | Macho .................... G10L 15/22 704/275 |
| 2014/0244269 | A1 | * | 8/2014 | Tokutake ...................... 704/275 |

(Continued)

FOREIGN PATENT DOCUMENTS

WO    WO 2009104195 A1 *  8/2009   ............ H04M 1/247

*Primary Examiner* — Thomas Lee
*Assistant Examiner* — Chad Erdman
(74) *Attorney, Agent, or Firm* — North Weber & Baugh LLP

(57) ABSTRACT

The invention relates to an electronic device that includes a wake-up system that operates at a substantially low power level and is applied to wake up the electronic device from a sleep mode. The wake-up system comprises a sound transducer that converts a received sound signal to an electrical signal and a keyword detection logic that preliminarily identifies a speech energy profile that corresponds to at least one of a plurality of keywords in a part of the electrical signal. In some embodiments, a keyword finder is further activated to identify with an enhanced accuracy whether the at least one keyword exists in the part of the electrical signal, and generates a wake-up control to activate a host of the electronic device from its sleep mode.

19 Claims, 2 Drawing Sheets

(56) References Cited

U.S. PATENT DOCUMENTS

2014/0257821 A1* 9/2014 Adams .................... G10L 25/93
704/275
2014/0278435 A1* 9/2014 Ganong, III ............ G10L 15/22
704/275

* cited by examiner

100

300

ALWAYS-ON LOW-POWER KEYWORD SPOTTING

CROSS REFERENCE TO RELATED APPLICATION

The application claims the benefit under 35 U.S.C. §119 (e) of Provisional Application Ser. No. 61/790,760, entitled "Always-On Low-Power Keyword Spotting," filed on Mar. 15, 2013, the subject matter of which is incorporated herein by reference in its entirety.

BACKGROUND

A. Technical Field

The present invention relates to an electronic device, and more particularly, to systems, devices and methods of waking up a host of the electronic device from its hibernation or sleeping state.

B. Background of the Invention

Almost all electronic devices reserve a sleep mode, a standby mode or a hibernation mode in which some, if not all, programs are inactive and as many processing units as possible stay in a hibernation state. These modes save significantly on electrical consumption by deactivating unneeded subsystems and only retaining necessary data storage in some random access memories (RAM). Given the large number of electronic devices in use worldwide, tremendous amount of energy may be conserved by using these energy conservation modes. Moreover, these energy conservation modes are especially critical for battery operated devices, such as mobile devices, not only because these devices are becoming universally applied as a trend in the future, but also because battery charging for these devices significantly impacts user experience. The sleep mode extends the battery life and reduces the charging frequency, largely improving the user experience with the battery operated devices in addition to the general benefit of energy conservation.

Most electronic devices terminate the sleep, standby or hibernation mode, and return to normal operation upon receiving a notice from device users. Oftentimes, the device users have to press a hardware button on the electronic devices to deliver the notice that they need to use the devices. For instance, most personal computers rely on a wake-up press of the power button or clicks on the keyboard to wake up. Although moving a mouse may also be sufficient to activate computers now, wake-up methods generally require a physical touch by the device users, and however, such a touch is not always available. For instance, it is nearly impossible to wake up a sleeping mobile phone that is located beyond an arm's reach, particularly while the device user is driving a car. Therefore, a need exists to remotely wake up a sleeping electronic device, while still maintaining low power consumption during the sleep mode.

SUMMARY OF THE INVENTION

Various embodiments of the present invention relate to an electronic device, and more particularly, to systems, devices and methods of incorporating a wake-up system that operates at a substantially low power level and wakes up a host of the electronic device from a sleep mode.

In accordance with one embodiment of the invention, the wake-up system comprises a sound transducer that converts a received sound signal to an electrical signal and a keyword detection logic that preliminarily identifies a speech energy profile that corresponds to at least one of a plurality of keywords in a part of the electrical signal. In some embodiments, a keyword finder is further activated to identify with an enhanced accuracy whether the at least one keyword exists in the part of the electrical signal, and generates a wake-up control to activate a host of the electronic device from its sleep mode.

In accordance with another embodiment of the invention, a method of waking up an electronic device from a sleep mode may be applied. A sound signal received by a sound transducer is converted to an electrical signal. A speech energy profile that corresponds to at least one of a plurality of keywords is preliminarily identified in a part of the electrical signal, and a keyword finder is subsequently activated from the sleep mode to further identify the at least one of the plurality of keywords with an enhanced accuracy. Based on such preliminary and accurate keyword identifications, a wake-up control is generated to activate a host of the electronic device from the sleep mode.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
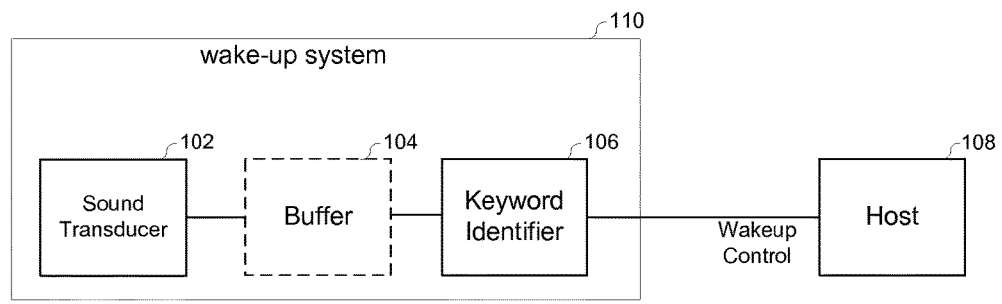
FIG. 1 illustrates an exemplary block diagram of an electronic device based on a wake-up system according to various embodiments in the invention.

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the present invention relate to an electronic device that incorporates a wake-up system, and more particularly, to systems, devices and methods of using a sound signal to remotely wake up a host of the electronic device from its hibernation, sleeping or standby state. A user may issue a voice wake-up command to the electronic device. Upon receiving the command, the wake-up system wakes up the host of the electronic device from a standby, sleep or hibernation mode, and thereafter, the electronic device returns to normal operation. On one hand, the wake-up system is capable of actively receiving and processing the voice wake-up command, even when the host is in the hibernation state. On the other hand, power consumption of the wake-up system is controlled at a substantially low level such that it does not burden the total power budget of the electronic device, particularly when the electronic device hibernates.

The electronic device adopts different activity levels to better conserve energy consumption. For instance, a laptop computer has a standby mode, a sleep mode and a hibernation mode that are associated with increasingly lower activity levels and lower energy consumption. More and more programs are disabled, and more and more hardware units are deactivated as the power level goes down. The standby mode may be simply associated with a dark screen. In the sleep mode, machine states are frozen at the moment prior to entry into the sleep mode, and data are temporarily stored in the RAMs that are constantly powered. However, in the hibernation mode, such data may be backed up in the hard disk, and the RAMs are also disabled to reserve more energy consumption. Various embodiments of the present invention are applied to wake up the electronic device from all these energy conservation modes. For clarity and simplicity, these modes are generally called as sleep modes in the present invention, even though they may involve different activity levels.

FIG. 1 illustrates an exemplary block diagram 100 of an electronic device based on a wake-up system according to various embodiments in the invention. The electronic device 100 comprises a sound transducer 102, a buffer 104, a keyword identifier 106 and a host 108. The sound transducer 102 is coupled to receive a sound signal, and converts it to an electrical signal. A part of the converted sound signal is buffered and stored within the buffer 104 for subsequent processing. The keyword identifier 106 processes the part of the converted sound signal, identifies a target keyword therein and generates a wake-up control. The host 108, coupled to keyword identifier 106, is activated and returns to its normal operation, when the target keyword is identified within the part of the converted sound signal. In particular, the sound transducer 102, the buffer 104 and the keyword identifier 106 constitutes the wake-up system 110 which functions to wake up the host 108 of the electronic device 100.

In various embodiments of the invention, the wake-up system 110 responds to a plurality of keywords, and to activate the host 108, the electronic device 100 may require one or more than one keyword being identified in the part of the converted sound signal.

In various embodiments of the invention, the sound signal is a pressure wave that may adopt a frequency within, below or beyond an audible range (20 Hz-20,000 Hz). In certain embodiments that involve most electronic devices applied in our daily use, the sound signal is audible. The part of the converted sound signal has to include a voice wake-up command issued by the device user. The voice wake-up command may include at least one keyword that the keyword identifier 106 interprets as a request to wake up the host 108. Such a keyword may be a phrase like "my cell phone" or "turn on TV."

In some embodiments, the electronic device 100 is applied for some special purposes, and the sound signal is ultrasound or infrasound. One example is to use the ultrasound signal to trigger the phone into waking up and running a specific application, such as a localized, specific health and safety warning for the user; or waking up other wireless or optical communication protocols within the device to receive or transmit relevant, localized data. Other non-audible examples and use cases are possible.

The wake-up system 110 has to maintain a substantially low level of power consumption, because the overall power budget for the electronic device 100 may be limited at the sleep mode. However, the keyword identifier 106 may involve certain complicated signal processing algorithms in order to accurately identify the target keyword. Power consumption of the keyword identifier 106 normally increases with the complexity of the signal process algorithms. As a result, the keyword identifier 106 having complicated signal processing algorithms is sometimes incompatible with the wake-up system 110.

To reduce energy consumption, keyword identification may be implemented in two steps, one preliminary step for quickly distinguishing the target keyword and another advanced step for accurately identifying the target keyword. The preliminary step involves limited power consumption, and is suitable for integration within the wake-up system 110.

Figure 2:
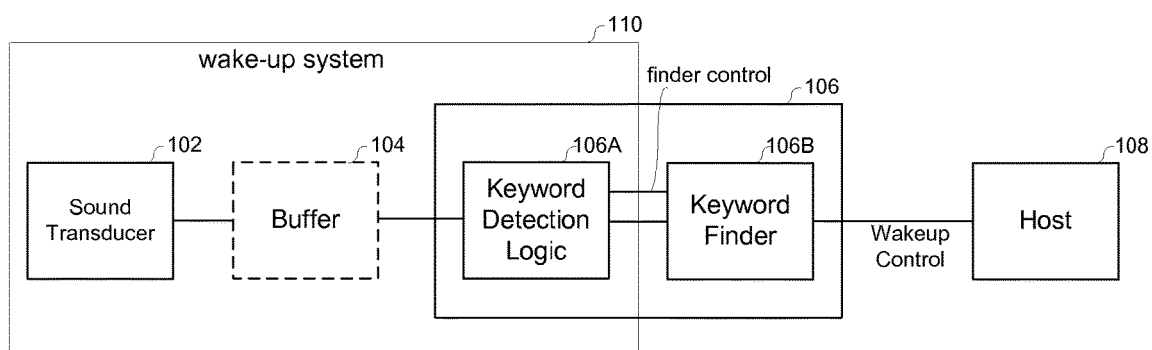
FIG. 2 illustrates another exemplary block diagram of an electronic device based on a wake-up system according to various embodiments in the invention.

FIG. 2 illustrates another exemplary block diagram 100 of an electronic device based on a wake-up system according to various embodiments in the invention. Keyword identification is split into two steps, one preliminary step and one advanced step, and these two steps are respectively implemented in keyword detection logic 106A and a keyword finder 106B. The keyword detection logic 106A is integrated within the wake-up system 110, and remains constantly active even when the host 108 is at the sleep mode. However, the keyword finder 106B is removed out of the wake-up system 110 and disabled during the sleep mode to reserve power consumption. In some embodiments, complicated signal processing algorithms are incorporated within the keyword finder due to its relatively scalable power budget.

The keyword detection logic 106A preliminarily identifies at least one target keyword in the part of the converted sound signal buffered in the buffer 104. The keyword detection logic 106A adopts a relatively simple signal processing algorithm, and thus, maintains a substantially low level of energy consumption. In one embodiment, the keyword detection logic 106A looks in the part of the converted sound signal for a certain kind of speech energy profile that may be associated with a voice wake-up command including certain keywords. In a certain embodiment, the keyword detection logic 106A uses the speech energy profile to distinguish the voice wake-up command from a regular conversational speech or a piece of background music. Upon detecting the energy profile, the keyword detection logic 106A enables the keyword finder 106B via a finder control signal, and transmits the part of the converted sound signal for further identification.

Upon being enabled, the keyword finder 106B starts up from the sleep mode, and accurately identifies keywords in the part of the converted sound signal. In certain embodiments, sophisticated sound processing methods are adopted within the keyword finder 106B to identify specific keywords in terms of both contents and voice features. Since the pitch of the voice varies among different people, the same keywords may not be identified if spoken by a person other than the actual device owner. Once the target keyword is identified by the keyword finder 106B, a wake-up control is generated to activate the host 108 that originally hibernates at the sleep mode.

In one embodiment, the speech energy profile could be bi-modal because a pair of keywords separated by a certain time interval is applied. For example, the keywords could be "Wakeup Myphone". The sound transducer 102 and the keyword detection logic 106A are constantly active to detect the pair of keywords. These two units consume a low level of power, e.g., a few milliwatts, while the rest of the electronic device 100 hibernates in the sleep mode. Once the bi-modal speech energy profile is detected, the keyword detection logic 106A passes on buffered speech samples that contain the keywords, "Wakeup Myphone" to the keyword finder 106B. The keyword finder 106B compares the buffered speech samples with the target keyword pair using state-of-the-art isolated word recognition techniques. If the target keyword pair is recognized in the buffered speech samples, the keyword finder 106B triggers a wake-up control to the host 108 which subsequently wakes up from the sleep mode. In some embodiments, the host 108 waits to accept further commands after the wake-up. If no further command is received in a pre-defined time interval, the host 108 returns to the sleep mode.

In one embodiment, the host 108 sends back a response upon receiving the wake-up control. This response is audible or visible, such that the user may rely on the wake-up system 110 to identify a location of a missing electronic device 100. In another embodiment, the wake-up system 110 is applied as a channel to receive commands from the user during an active mode. Particularly when a driver is driving a car and not able to dial a mobile phone, he or she may wake up the mobile phone and dial a certain telephone number. A series of commands are recovered from the sound signal spoken by the driver to consecutively wake up the phone, optionally unlock the phone and place a call.

In accordance with the invention, the sound transducer 102 is a microphone that preferably requires low power consumption. In one embodiment, a conventional loudspeaker seen in many electronic devices is re-tasked for use as the sound transducer 102 in the sleep mode. The acoustic diaphragm within the loudspeaker is set into movement by the sound pressure level and causes the voice coil to move within a magnet field. A voltage across terminals of the voice coil is therefore generated proportionally to the magnitude of the sound pressure level received. By this means, the re-tasked loudspeaker behaves like a dynamic microphone, converting the sound signal to a corresponding electrical signal.

As the conventional loudspeaker is used as the sound transducer 102, the always on power is significantly reduced. In particularly, almost every mobile device has one or more built-in microphones. However, such conventional microphones as typically available and used are not preferred, due to their relatively high power consumption. These microphones normally requires to be enabled by a constant bias current, and this bias current is typically between 150 uA and 2 mA. Given that the total power budget for the sleep mode is only a few milliwatts, the microphone and associated bias would consume a significant part of this budget.

Moreover, the typical microphone only sustains a single mode for sound transducing; however, the wake-up system 110 may function better at a lower power level when two modes of sound transducing are involved. In a first mode, the sound transducer 102 is a re-tasked loudspeaker providing a simplified electrical signal that is sufficient for preliminary sound identification, particularly for distinguishing the voice wake-up command based on a certain kind of speech energy profile. In a second mode, part of the converted sound signal is captured already and buffered for keyword identification in the keyword finder 106B. Subsequent speech in this second mode, can then be more accurately captured by enabling the conventional microphones(s) which record more accurately at a slightly higher power level. Therefore, later details of the converted sound signal are recorded with high fidelity. The sound transducer 102 works most of its operation time at the first mode which requires a much lower power to operate than the second mode. The convention microphone only operates in the second mode, optimizing the first mode to reduce power consumption during most of the operational time.

Therefore, the sound transducer 102 is preferably implemented using a combination of 1) a re-tasked loudspeaker and 2) conventional microphone(s) which translate the sound pressure based on more than one mode. In certain embodiments involving infrasound and ultrasound, the sound transducer 102 are also engineered to respond to the sound signal in the corresponding frequency range.

In various embodiments of the invention, the buffer 104 is incorporated within the acoustic sensor 102 or keyword identifier 106A to temporarily store a part of the converted sound signal. One of those skilled in the art knows that the buffer 104 is optionally illustrated as an independent component in FIGS. 1 and 2.

Figure 3:
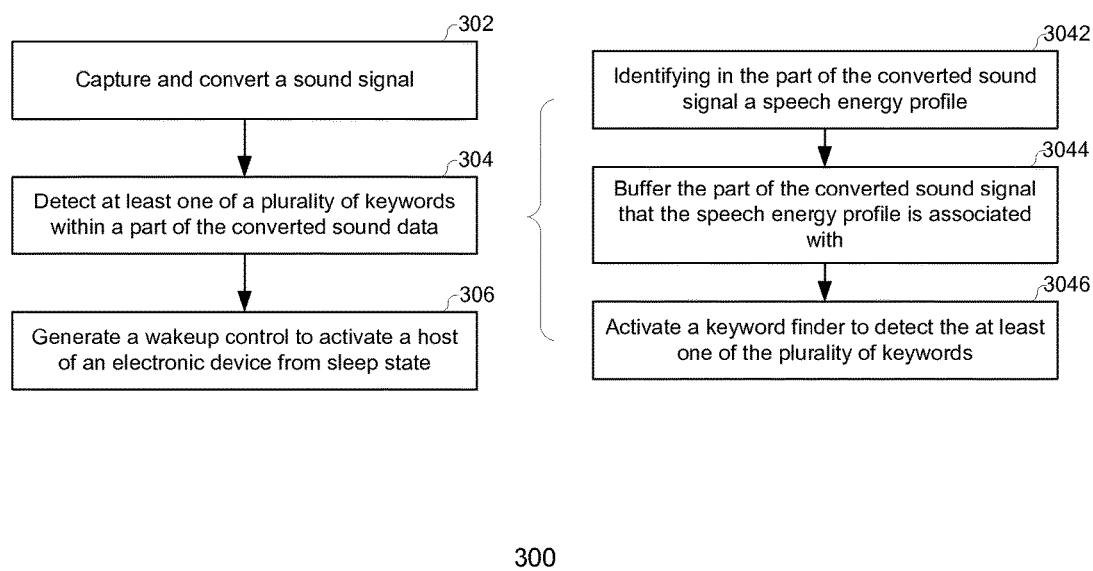
FIG. 3 illustrates a method of waking up an electronic device from a sleep mode according to various embodiments in the invention.

FIG. 3 illustrates an exemplary method 300 of waking up an electronic device from a sleep mode according to various embodiments in the invention. At step 302, a sound signal is captured and converted to an electrical signal. At step 304, at least one of a plurality of keywords is detected in a part of the converted sound signal. At step 306, a wake-up control is generated to activate the host of the electronic device from a sleep mode.

To further conserve power consumption at the sleep mode, step 304 is split into one preliminary and one advanced keyword identification step. At step 3042, a speech energy profile is first identified in the part of the converted sound signal to correspond to the at least one of the plurality of keywords. At step 3044, the part of the converted sound signal that is associated with the speech energy profile is buffered. At step 3046, a keyword finder is activated to detect the at least one of the plurality of keywords in the part of the converted sound signal. Step 3042 is constantly implemented to coarsely detect the speech energy profile corresponding to the keywords, while steps 3044 and 3046 are implemented only when such a speech energy profile is successfully identified. Given that accurate keyword identification at step 3046 is normally power hungry, such an arrangement based on separate identification steps may efficiently reduce the overall power consumption required by the device wake-up function.

One of those skilled in the art knows that the electronic device 100 may be a desktop computer, a laptop computer, a tablet, a mobile phone, a television and many other devices that incorporate a sleep mode and need to start up from the sleep mode. As mobile devices are widely applied in our daily life, the present invention is particularly useful for starting up the mobile devices conveniently, while consuming limited amount of battery energy during the sleep mode.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A wake-up system that wakes up an electronic device from a sleep mode, comprising:
    a first sound transducer that converts a part of a sound signal to a first electrical signal, wherein the first sound transducer is re-tasked from a conventional loudspeaker,
    a keyword detection logic, coupled to the first sound transducer, the keyword detection logic preliminarily identifying in a part of the first electrical signal a speech energy profile that corresponds to at least one of a plurality of keywords and generating a first wake-up control;
    a second sound transducer that converts a part of the sound signal to a second electrical signal and operates at a higher power level than the first transducer; and
    a keyword finder coupled to the wake-up system, activated from the sleep mode by the first wake-up control, identifying the at least one of the plurality of keywords with an enhanced accuracy and generating a second wake-up control to activate complete functionality of a host of the electronic device from the sleep mode.

2. The wake-up system according to claim 1, wherein the wake-up system is constantly powered with a substantially low power level regardless of whether the host of the electronic device is at the sleep mode or not.

3. The wake-up system according to claim 1, wherein the wake-up system further comprises a buffer to temporarily store the part of the first electrical signal.

4. The wake-up system according to claim 1, wherein the keyword detection logic adopts a simpler sound processing method and consumes less power than the keyword finder does.

5. The wake-up system according to claim 1, wherein the first and second sound transducers operate at two modes to reduce power consumption, the part of the sound signal being captured by the first sound transducer to simply generate the first electrical signal sufficient for preliminary sound identification in the keyword detection logic in a first mode, the part of the sound signal being accurately captured by the second sound transducer for enhanced sound identification in the keyword finder in a second mode.

6. The wake-up system according to claim 1, wherein the at least one of the plurality of keywords is distinguished from a regular conventional talk or a piece of background noise like music.

7. The wake-up system according to claim 1, wherein the sound signal includes a voice wake-up command that further includes the at least one of the plurality of keywords, and upon receiving the voice wake-up command, the wake-up system wakes up the host of the electronic device from the sleep mode.

8. The wake-up system according to claim 1, wherein the host sends back a response upon receiving the first wake-up control, such that the user may rely on the wake-on system to identify the location of the electronic device.

9. The wake-up system according to claim 1, wherein the sound signal is associated with a pressure wave that adopts a frequency outside an audible frequency range.

10. A method of waking up an electronic device from a sleep mode, comprising the steps of:
    converting a part of a sound signal received by a first sound transducer to a first electrical signal, wherein the first sound transducer is re-tasked from a conventional loudspeaker;
    preliminarily detecting in a part of the first electrical signal a speech energy profile that corresponds to at least one of a plurality of keywords;
    converting a part of the sound signal received by a second sound transducer to a second electrical signal, the second sound transducer operating at a higher power level than the first transducer;
    activating a keyword finder from the sleep mode to further identify the at least one of the plurality of keywords with an enhanced accuracy; and
    generating a wake-up control to activate a host of the electronic device from the sleep mode.

11. The method of waking up the electronic device according to claim 10, wherein the at least one of the plurality of keywords is distinguished from a regular conventional talk or a piece of background noise like music.

12. The method of waking up the electronic device according to claim 10, wherein the first and second sound transducers operate at two modes to reduce power consumption, the part of the sound signal being captured by the first transducer to simply generate the electrical signal sufficient for preliminary sound detection in a first mode, the part of the sound signal being accurately captured by the second transducer for enhanced sound identification in the keyword finder in a second mode.

13. The method of waking up the electronic device according to claim 10, wherein the sound signal is associated with a pressure wave that adopts a frequency outside an audible frequency range.

14. The method of waking up the electronic device according to claim 10, wherein the speech energy profile is bi-modal as the at least one of the plurality of keywords is associated with a pair of keywords separated by a time interval.

15. An electronic device, comprising:
    a wake-up system that is constantly powered at a substantially low power level, further comprising (1) a first sound transducer that receives a sound signal and converts a part of the sound signal to an electrical signal, wherein the first sound transducer is re-tasked from a conventional loudspeaker, (2) a second sound transducer that converts a part of the sound signal to an electrical signal and operates at a higher power level than the first sound transducer, and (3) and a keyword detection logic, coupled to the first sound transducer, the keyword detection logic preliminarily detecting in a part of the electrical signal converted by the first sound transducer a speech energy profile that corresponds to at least one of a plurality of keywords and initiating a data transfer; and a keyword finder, coupled to the wake-up system and the second transducer, the keyword finder further identifying the at least one of the plurality of keywords with an enhanced accuracy and generating a wake-up control to activate a host of the electronic device.

16. The electronic device according to claim 15, wherein in the sleep mode, the electronic device adopts different activity levels to disable different programs and deactivate different hardware units.

17. The electronic device according to claim 15, wherein the host sends back a response upon receiving the first wake-up control, such that the user may rely on the wake-on system to identify the location of the electronic device.

18. The electronic device according to claim 15, wherein the wake-up system further comprises a buffer to temporarily store the part of the electrical signal converted by the first sound transducer.

19. The electronic device according to claim 15, wherein the sound signal is associated with a pressure wave that adopts a frequency outside an audible frequency range.

* * * * *